(12) United States Patent
Kubo et al.

(10) Patent No.: US 6,503,165 B1
(45) Date of Patent: Jan. 7, 2003

(54) HYDRAULIC CONTROL DEVICE FOR AUTOMATIC TRANSMISSION

(75) Inventors: Takayuki Kubo, Anjo (JP); Hiroshi Niki, Anjo (JP); Shigeyasu Kozaki, Anjo (JP)

(73) Assignee: Aisin AW Co., Ltd. (JP)

( * ) Notice: Subject to any disclaimer, the term of this patent is extended or adjusted under 35 U.S.C. 154(b) by 32 days.

(21) Appl. No.: 09/694,788

(22) Filed: Oct. 24, 2000

(30) Foreign Application Priority Data

Oct. 25, 1999 (JP) .......................................... 11-302131

(51) Int. Cl.[7] .............................................. F16H 31/00
(52) U.S. Cl. ........................ 475/125; 475/117; 477/143; 477/155
(58) Field of Search ................................ 477/143, 155, 477/98, 902; 475/117, 125

(56) References Cited

U.S. PATENT DOCUMENTS

| 5,119,695 | A | * | 6/1992 | Milunas et al. | ................ 477/98 |
| 5,207,122 | A | * | 5/1993 | Minagawa | ................... 475/125 |
| 5,304,102 | A | * | 4/1994 | Narita et al. | ................. 475/125 |
| 5,368,531 | A | | 11/1994 | Ando et al. | .................. 477/155 |

* cited by examiner

Primary Examiner—Sherry Estremsky
(74) Attorney, Agent, or Firm—Lorusso & Loud

(57) ABSTRACT

A hydraulic control device for an automatic transmission capable of preventing engine racing and tie-up by controlling disengagement side oil pressure in accordance with an input torque and an oil temperature. Gear-change execution controller U4 controls drain timings T1 and T3 and a drain gradient δP of the disengagement side oil pressure acting on the frictional engagement elements of the disengagement side according to the magnitude of the input torque and elevation of the oil temperature in torque phase control wherein both the engagement side oil pressure and the disengagement side oil pressure are controlled.

7 Claims, 11 Drawing Sheets

HYDRAULIC CONTROL DEVICE FOR AUTOMATIC TRANSMISSION

BACKGROUND OF THE INVENTION

1. Field of the Invention

The present invention relates to a hydraulic control device for an automatic transmission in an automobile. The invention specifically relates to a hydraulic control device for controlling oil pressures for predetermined frictional engagement elements and other frictional engagement elements in a clutch-to-clutch gearshift to engage the predetermined frictional engagement elements.

2. Background of the Invention

U.S. Pat. No. 5,368,531 discloses a method for performing hydraulic servo control for an automatic transmission where, at the time of an up-shift to a predetermined speed, for example a gear-change from second gear to third gear (wherein a brake B-2 is engaged and at the same time a brake B-3 is disengaged), a supply pressure (B-2 pressure) to a hydraulic servo and an accumulator on the engagement side acts on a control chamber of a 2–3 timing valve. A release pressure (B-3 pressure) communicating with a hydraulic servo and an accumulator on the disengagement side is decreased so that the engagement pressure and the release pressure are adjusted to be inversely proportional. The release pressure is controlled to decrease linearly from the point in time when the speed-change starts until at least the end of the torque phase.

The foregoing method for performing hydraulic servo control allows change of engagement and disengagement timings in accordance with change in the throttle opening during gear-shifting, unlike other methods where the pressure is released at a predetermined timing in one setting. As a result, gear-shift shock can be reduced.

However, in the above-mentioned method for performing hydraulic servo control, oil pressure supplied to the disengagement side hydraulic servo is released linearly with predetermined timing irrespective of the input torque and the temperature of the hydraulic fluid supplied to the hydraulic servo and, as a consequence, when the input torque and/or the oil temperature are high, engine racing can occur. Further, low input torque and/or low oil temperature can cause tie-up. Therefore, a need exists for development of a hydraulic control device that can decrease the disengagement side oil pressure in accordance with the magnitude of the input torque and the oil temperature.

SUMMARY OF THE INVENTION

Accordingly, it is an object of the present invention to provide a hydraulic control device that solves the above-described problem by controlling the disengagement side oil pressure in accordance with the magnitude of the input torque and the oil temperature.

To achieve the foregoing object, the present invention provides a hydraulic control device for an automatic transmission which includes an input shaft which receives torque from an output shaft of an engine, an output shaft connecting to drive wheels, a plurality of frictional engagement elements for changing a torque transfer path between the input and output shafts, and hydraulic servos for engaging or disengaging the frictional engagement elements. In the transmission, up-shift to a predetermined gear ratio is achieved by engaging first frictional engagement elements of the plurality of frictional engagement elements at a predetermined engagement side oil pressure and disengaging second frictional engagement elements at a predetermined disengagement side oil pressure. The hydraulic control device is provided with input torque calculation means for calculating input torque, and gear-change execution control means for controlling the oil pressure so as to change timing of draining of the disengagement side oil pressure acting on the second frictional engagements elements ("drain timing") in dependency on the magnitude of the input torque calculated by the input torque calculation means in torque phase control wherein both of the engagement side oil pressure and the disengagement side oil pressure are controlled.

In a preferred embodiment of the invention, the gear-change execution control means controls the drain timing (T1, T3) of the disengagement side oil pressure acting on the second frictional engagement elements in accordance with increase of oil temperature in the torque phase control wherein both the engagement side oil pressure and the disengagement side oil pressure are controlled.

The gear-change execution control means preferably controls a drain gradient ($\delta P$) of the disengagement side oil pressure acting on the second frictional engagement elements in accordance with the magnitude of the input torque in the torque phase control wherein both the engagement side oil pressure and the disengagement side oil pressure are controlled.

In another preferred embodiment, the gear-change execution control means controls a drain gradient ($\delta P$) of the oil pressure acting on the second frictional engagement elements in accordance with elevation of the oil temperature in the torque phase control wherein both the engagement side oil pressure and the disengagement side oil pressure are controlled.

The gear-change execution control means preferably advances the drain timing (T1, T3) as the input torque decreases. Likewise, the gear-change execution control means preferably advances the drain timing (T1, T3) as the oil temperature decreases. Further, the gear-change execution control means preferably makes the drain gradient ($\delta P$) of the oil pressure steeper as the oil temperature increases.

Symbols appearing above in parentheses are used for the purpose of correlation with the drawings and are not intended to impose any limitation on the scope of the present invention.

Control of the drain timing (T1, T3) of the disengagement side oil pressure acting on the second frictional engagement elements in accordance with the magnitude of the input torque, in torque phase control wherein both of the engagement side oil pressure and the disengagement side oil pressure are controlled, makes it possible to prevent the tie-up and the engine racing that might otherwise result from the changing over of engagement.

The preferred control of the release time of the disengagement side oil pressure, taking both the oil temperature and the magnitude of the input torque into consideration, allows more effective control of the automatic transmission especially in cold regions.

Preferably, the drain gradient ($\delta P$) of the disengagement side oil pressure acting on the second frictional engagement elements is controlled in accordance with the magnitude of the input torque. The release speed of the disengagement side frictional engagement elements is thus controlled in accordance with the input torque, making it possible to effectively prevent engine racing and the tie-up.

As noted above, the drain gradient ($\delta P$) of oil pressure acting on the second frictional engagement elements is preferably controlled in accordance with elevation of the oil temperature. Such a delicate control becomes possible by, at high oil temperatures, making the drain gradient steeper while coping with the response delay at around zero oil pressure, and, at low oil temperatures, making the oil draining slower so that the draining is controlled in accordance with the state of the engagement side.

As also noted above, the drain timing (T1, T3) of the oil pressure is advanced in time as the input torque becomes smaller. This feature prevents tie-up due to drag torque at a low oil temperature. Moreover, at a high oil temperature and high input torque, control delaying the drain timing may prevent the engine racing due to the engagement delay in the engagement side frictional engagement element.

The preferred embodiment wherein the control advances the drain timing (T1, T3) of the oil pressure (to an earlier point in time) as the oil temperature decreases makes it possible to have a release operation account for the response delay in the disengagement side frictional engagement elements, thus preventing tie-up.

The preferred control wherein the drain gradient of the oil pressure is made steeper as the oil temperature increases makes it possible to drain the disengagement side at an advanced time to cope with the response delay at around zero oil pressure at a high oil temperature.

DESCRIPTION OF A PREFERRED EMBODIMENT

An automatic transmission to be controlled by the hydraulic controller of the invention includes many frictional engagement elements such as clutches and brakes, and a planetary gear mechanism for selectively establishing a torque transfer path through suitable engagement and disengagement of the frictional engagement elements. The input shaft of the automatic transmission mechanism is connected to the output shaft of an engine through a torque converter. The output shaft of the automatic transmission gear mechanism is linked to the drive wheels. Preferably, the automatic transmission has five forward gear ratios and one reverse gear ratio as disclosed in JP Laid-Open ("Kokai") No. HEI 09-21448.

Figure 1:
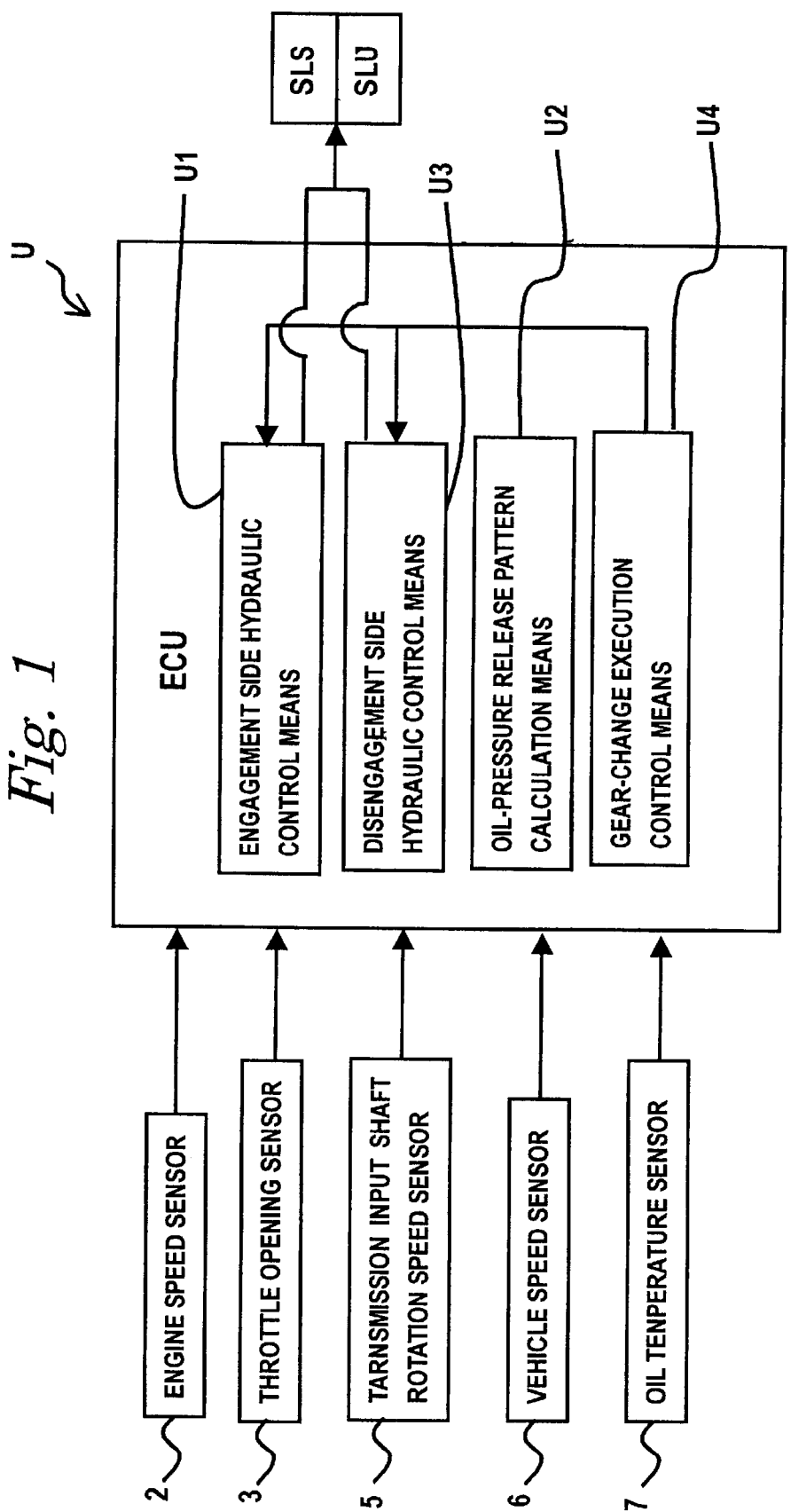
FIG. 1 is a block diagram showing an electronic control unit according to one embodiment of the present invention.

FIG. 1 is a block diagram illustrating an embodiment of an electric control circuit in the present invention. A control unit (ECU) U is a microcomputer which receives input signals from an engine rotational speed sensor 2, a throttle opening sensor 3 which detects the amount of accelerator pedal depression by a driver, an input shaft rotational speed sensor 5 which detects input shaft rotational speed (=turbine rotational speed) of the transmission mechanism, a vehicle speed (=automatic transmission output shaft rotational speed) sensor 6, and an oil temperature sensor 7. The control unit U includes engagement side oil pressure control means U1 for controlling the engagement side oil pressure, disengagement side oil pressure control means U3 for controlling the disengagement side oil pressure, oil-pressure release pattern calculation means U2, and gear-change execution control means U4. The control unit U outputs control signals to linear solenoid valves SLS, SLU.

Figure 2:
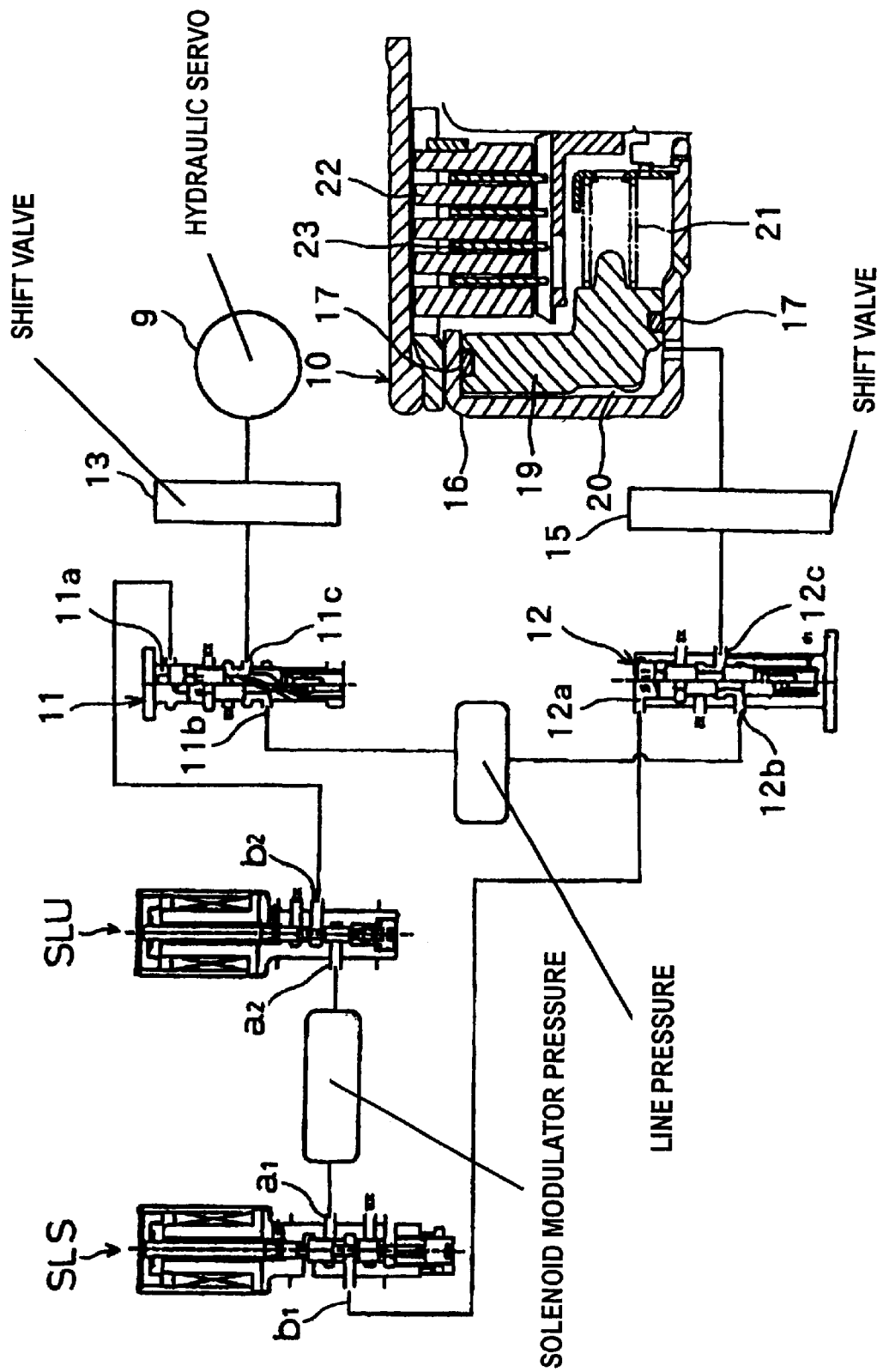
FIG. 2 is a diagram showing the outline of a hydraulic circuit for the embodiment of FIG. 1.

FIG. 2 is a view showing the outline of the hydraulic circuit, which includes the two linear solenoid valves SLS, SLU and a plurality of hydraulic servos 9, 10 that engage and disengage a plurality of frictional engagement elements (clutches and brakes) to establish the various gear ratios. For example, four or five forward gear ratios and one reverse gear ratio may be selectively established by changing the torque transfer path through the planetary gear unit of the automatic transmission mechanism. Input ports a1, a2 of the linear solenoid valves SLS and SLU receive a solenoid modulator pressure. The linear solenoid valves SLS, SLU apply control pressures through their output ports b1, b2 to control hydraulic chambers 11a, 12a of pressure control valves 11, 12. Input ports 11b, 12b of the pressure control valves 11, 12 receive a line pressure. The output pressures, as regulated by the control pressures, are suitably applied from the output ports 11c, 12c to the hydraulic servos 9, 10 via shift valves 13, 15, respectively.

The hydraulic circuit of FIG. 2 shows only the hydraulic servos 9, 10 and the shift valves 13, 15 to illustrate the concept. Actually, the automatic transmission mechanism is provided with additional hydraulic servos and shift valves for switching the hydraulic pressures to the hydraulic servos. Moreover, in each hydraulic servo, as exemplified by the hydraulic servo 10, a piston 19 is fitted in a cylinder 16 oil-tight through an oil seal 17. The piston 19 is moved against the force from a return spring 21 in accordance with the regulated pressure applied from the control valve 12 to hydraulic chamber 20 to bring outer frictional plates 22 into contact with inner frictional members 23. Although the frictional plates 22 and members 23 are shown in the form of a clutch, it should be understood that brakes may be constructed and operated in a similar manner.

Next, the hydraulic controller according to the present invention will be described with reference to FIG. 3 through FIG. 11.

Figure 3:
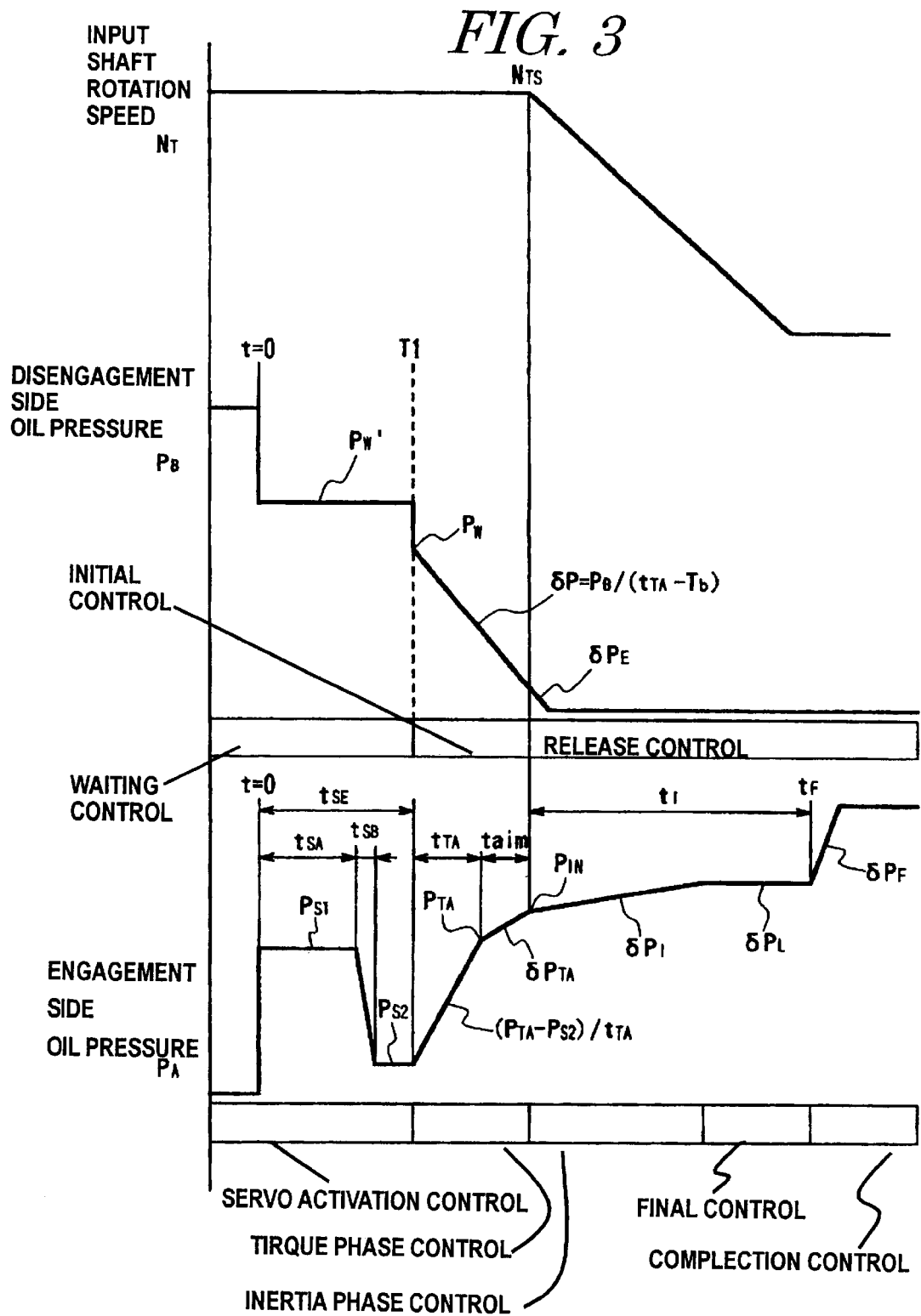
FIG. 3 is a time chart showing the input shaft rotational speed, the disengagement side oil pressure, and the engagement side oil pressure in a power-on/up-shift gear-change.
Figure 4:
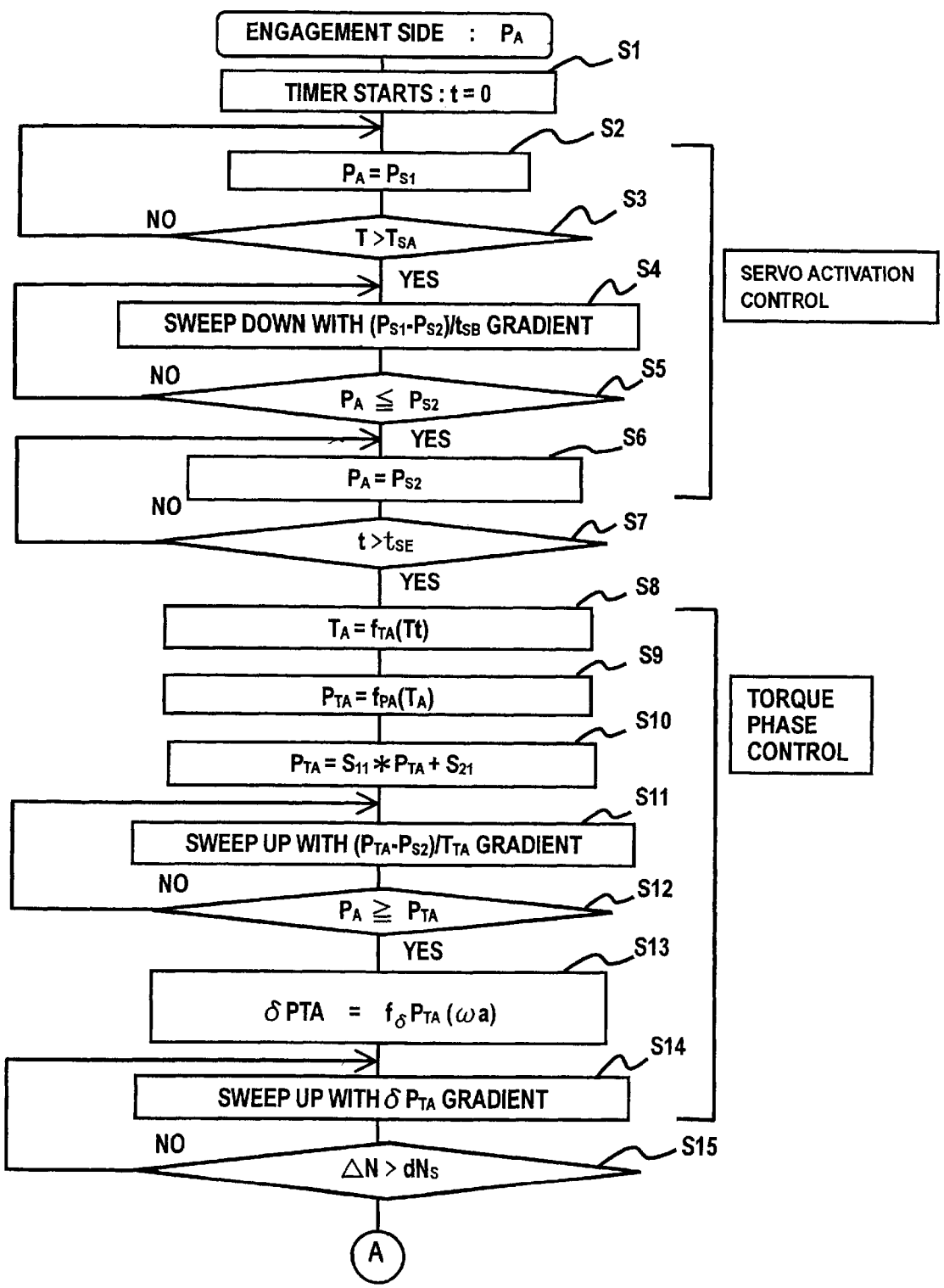
FIG. 4 is part of a flow chart showing a routine for control of the engagement side oil pressure in an up-shift gear-change.
Figure 5:
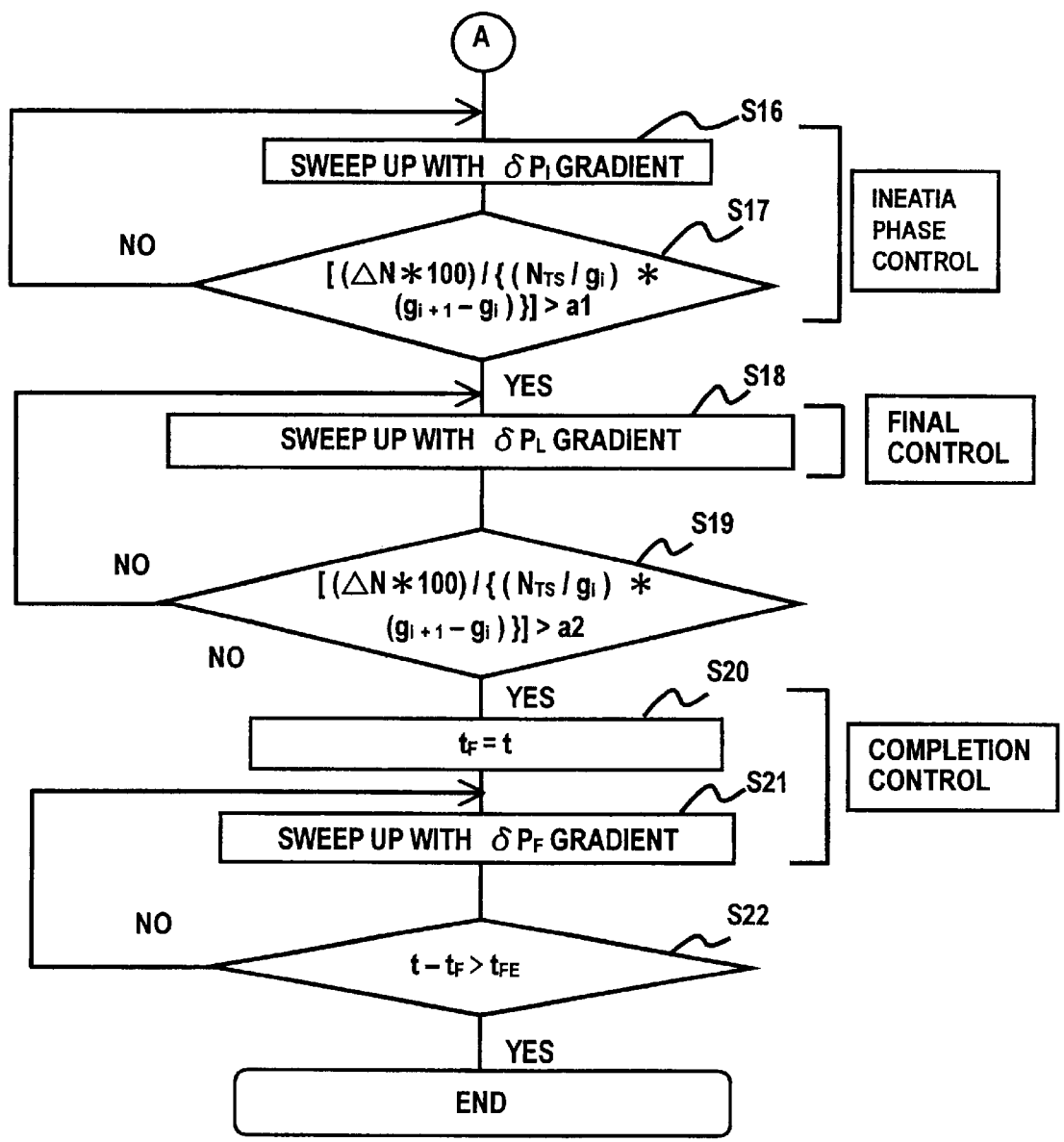
FIG. 5 is a continuation of the flow chart of FIG. 4.

A shift, for example, an up-shift from second gear to third gear, is determined by the gear-change execution control means U4 based on a shift map stored in the control unit U and application thereto of the signals from the throttle opening sensor 3 and the vehicle speed sensor 6. The frictional engagement elements of the engagement side are controlled through the engagement side oil pressure control means U1 according to the control routine shown in FIG. 4 and FIG. 5. Referring to FIG. 3 through FIG. 5, after a predetermined time for preparation operation of a selected shift valve has elapsed, shift controls for engagement side pressure $P_A$ and disengagement side pressure $P_B$ are started (S1). In the gear-change control, when the driver maintains a substantially constant pressure on the accelerator pedal, the up-shift control in the power-on state controls transfer of the driving force from the engine to the drive wheels. A signal is output to the linear solenoid valve SLS (or SLU) so that the engagement side pressure $P_A$ applied to the engagement side hydraulic servo is brought to a predetermined pressure Ps1.(S2) The predetermined pressure (pressure limit) Ps1 is set to fill up the hydraulic chamber 20 of the hydraulic servo, and is maintained for a predetermined time $t_{SA}$. After lapse of the predetermined time $t_{SA}$, the engagement side pressure PA is decreased over time with a predetermined rate of decrease (hereinafter referred to as "sweep down") [(Ps1–Ps2)/$t_{SB}$]. When the engagement side pressure $P_A$ has decreased to a predetermined low pressure Ps2 (S5), the sweep-down is stopped, and the engagement side pressure $P_A$ is maintained (in stand-by) at the predetermined low pressure Ps2 (S6). The predetermined low pressure Ps2 is set to be higher than a piston stroke pressure so that there is no rotational speed change at the input shaft. It is maintained until lapse of a time t which equals a predetermined time $t_{SE}$ (S7). Steps S1 through S7 relate to a servo start control whereby the piston 19 of the hydraulic servo 10 is moved into the state immediately preceding establishment of a torque capacity (torque transfer) by eliminating clearances between the frictional plates 22, 23 of the frictional engagement elements.

An engagement side allotment torque TA is calculated based on the input torque Tt (for example, $T_A=1/a \cdot Tt$, where "a" is an assumed torque allotment ratio)(S8). A target engagement oil pressure $P_{TA}$, which establishes the input rotational speed $N_T$ (the speed immediately preceding start of an inertia phase), is calculated based on a predetermined function which is changed according to the engagement side allotment torque $T_A$ (S9). The target engagement oil pressure $P_{TA}$ is calculated based on the formula $$P_{TA}=(T_A/A_A)+B_A+dP_{TA}$$

where $B_A$ is the piston stroke pressure (=spring load); $A_A$ is the effective radius of the frictional engagement element (effective diameter of the frictional plate×piston area the number of frictional plates×coefficient of friction); and $dP_{TA}$ is an increment of hydraulic pressure set for delay of application of a hydraulic pressure. The target engagement pressure $P_{TA}$ is corrected based on tie-up ratios S11, S12 representing the degree of tie-up set in consideration of driving comfort (S10). A predetermined gradient [($P_{TA}$–Ps2)/$t_{TA}$] is calculated based on the engagement pressure $P_{TA}$, which, in turn, is calculated based on the input torque Tt and serves to bring the engagement side frictional engagement element to the state which immediately precedes start of the inertia phase, and a predetermined time $t_{TA}$. The engagement side pressure $P_a$ is increased over time with a predetermined rate of increase (hereinafter referred to as "sweep up")(S11). By the first sweep up having a comparatively steep gradient, the engagement side torque is increased and the engagement side pressure $P_A$ is increased to the state which immediately precedes the start of the input shaft rotational speed change, that is to say, to the engagement target pressure $P_{TA}$ (S12).

The input torque Tt (i.e. turbine torque) is calculated based on the vehicular traveling conditions. For example, the engine torque is determined by linear interpolation using a map based on the throttle opening and the engine speed. Then the gear ratio of the input and output shafts is calculated from the numbers of revolutions of the input and output shafts of the torque converter, based on which the torque ratio is obtained using a map. Finally, the input torque can be obtained by multiplying the thus determined engine torque by the thus determined torque ratio.

When the engagement side oil pressure $P_A$ increases to the target engagement oil pressure $P_{TA}$, that is, when the inertia phase begins with the beginning of change in the input shaft rotational speed $N_T$, rate of change $\delta P_{TA}$ of the oil pressure is calculated as $[\delta P_{TA}=f\delta_{PTA}(\omega a)]$, where $\omega a$ is a target rotational change rate that is set as a target when the input shaft rotational speed $N_T$ starts to change (S13). The rate of change $\delta P_{TA}$ of the engagement side pressure $P_A$ is calculated as $\delta P_{TA}=[I\,\omega a]/[k\,taim]$ where k is a constant, taim is a target shift start time, and I is the amount of inertia. Then the engagement side pressure $P_A$ undergoes sweep-up with the gradient $\delta P_{TA}$ (S14). The second sweep-up is continued until a rotational change amount $\Delta N$ becomes a rotational speed dNs, indicating start of the shift (S15). The engagement side oil pressure $P_A$ becomes the inertia phase starting oil pressure $P_{IN}$ where the clutch capacity becomes approximately the same as the engine torque.

The control routine in steps S8 to S14 is the torque phase control wherein the torque allotted to the engagement side frictional engagement elements is increased and the torque allotted to the disengagement side frictional engagement elements is decreased, so as to change only the torque allotment at the gear ratio before up-shifting (second ratio).

An engagement side pressure change $\delta P_I$ is set by a feedback control based on the amount of rotational speed change $\Delta N$ which, in turn, is based on the values detected by the input shaft rotational speed sensor 5. Then the engagement side pressure $P_A$ undergoes sweep-up with the gradient $\delta P_I$ (S16). The sweep-up with the gradient $\delta P_I$ is continued until the rotational speed change $\Delta N$, from shift start to shift end, reaches a1[%], for example, 70% (S17). In other words, the sweep-up is continued until $(\Delta N \times 100)/=\{(N_{TS}/gi)\times(gi+1-gi)\}$ becomes a1[%], where $N_{TS}$ is the input shaft rotational speed at the shift start, $\Delta N$ is the amount of rotational speed change, gi is the gear ratio before the shift, and gi+1 is the gear ratio after the shift. The control routine in steps S16, S17 corresponds to the inertia phase control wherein the hydraulic control device changes the load of the engine and thereby changes its rotational speed.

Moreover, when the amount of change in the rotational speed exceeds the a1[%] of the total (target) rotational speed change, a different oil pressure change $\delta P_L$ obtained by a feedback control based on a smooth input shaft rotational speed change $\Delta N$ is set, and the engagement side oil pressure is swept-up with the gradient of $\delta P_L$ (step S18). The oil pressure change $\delta P_L$ has a generally gentler gradient than $\delta P_I$ and the sweep-up is continued until the rotational speed change reaches a2[%]of that obtained from the shift start (start of the change in the rotational speed) to approximately the shift end, for example, 90[%](S19). The target shift times $t_I$ for the sweep-ups with the gradient $\delta P_I$ and the gradient $\delta P_L$ are set based on a throttle-opening/vehicle speed map selected according to oil temperature. Step S18 corresponds to the final stage control.

After the target shift time $t_I$ has elapsed, the time $t_F$ is set (S20). This state substantially corresponds to the state in which the inertia phase and final stage control have ended. Further, a comparatively steep oil pressure change $\delta P_F$ is set to sharply sweep up the oil pressure (S21). After a predetermined time $t_{FE}$, which is set to be sufficient to increase the engagement pressure, has elapsed from the time $t_F$ (S22), the engagement side oil pressure control is ended. The steps S20 and S21 represent completion control.

Figure 6:
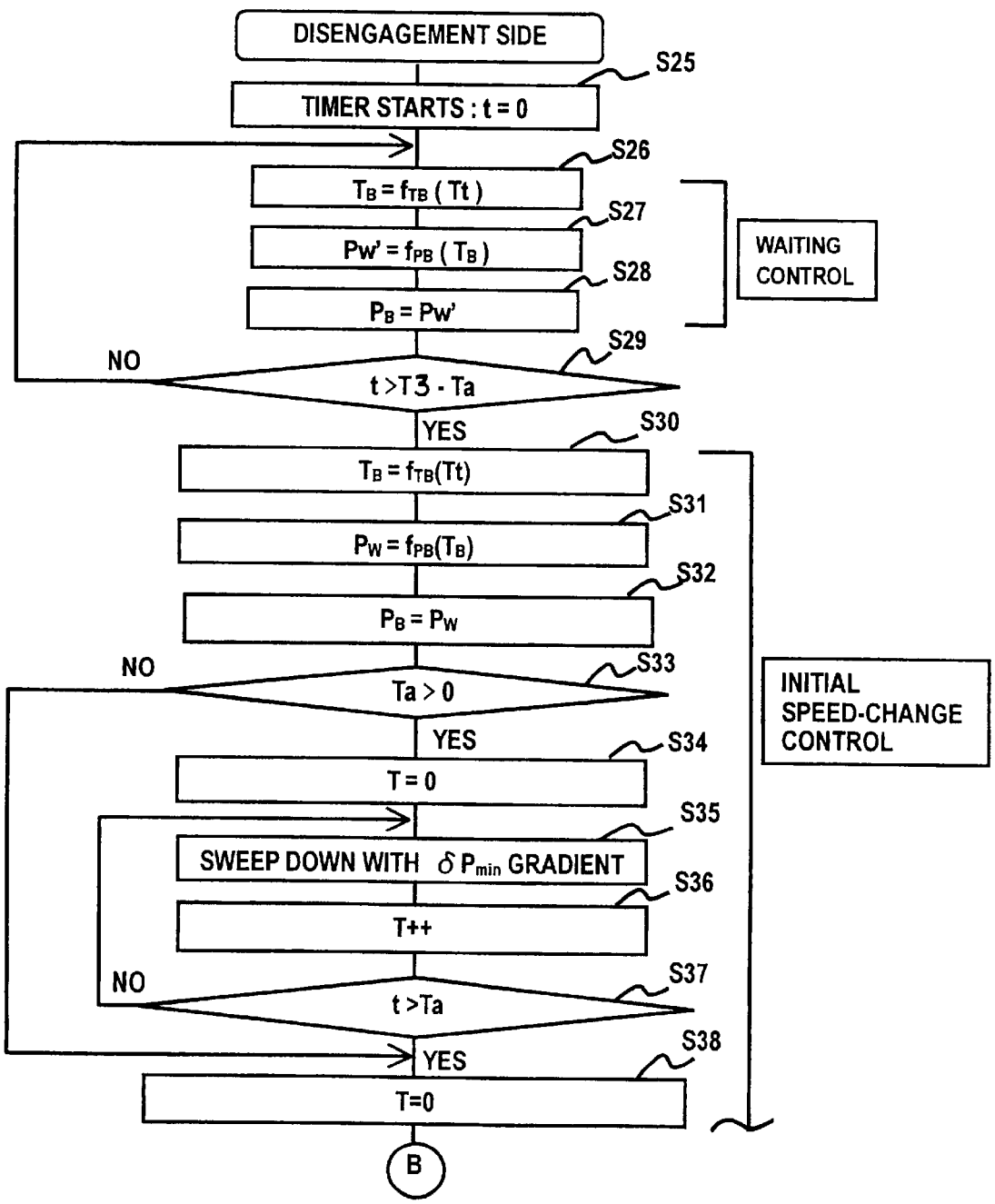
FIG. 6 is a partial flow chart of a routine for control of the disengagement side oil pressure in an up-shift gear-change.
Figure 7:
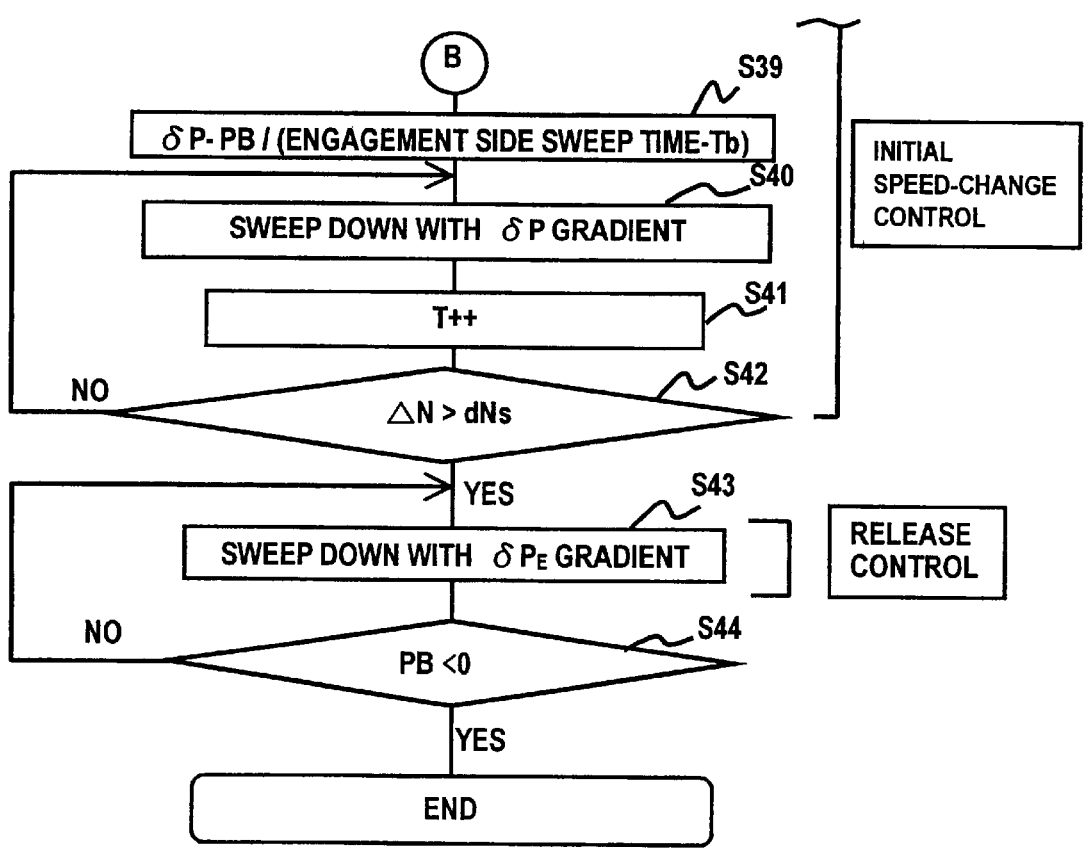
FIG. 7 is the remainder of the flow chart of FIG. 6.

Referring to FIG. 3, FIG. 6, and FIG. 7, control of the disengagement side oil pressure $P_B$ by the gear-change execution control means U4 in the above-described up-shift will be described.

In response to the gear-change instruction from the gear-change execution control means U4, clocking the time of the disengagement side oil pressure control is started in parallel with that of the engagement side oil pressure control (S25). Then, the allotment torque $T_B$ of the disengagement side frictional engagement element is calculated based on the input torque $T_t$ (S26). Further the engagement pressure $P_W'$ to establish the disengagement side allotment torque $T_B$ is calculated (S27) and supplied as the release oil pressure $P_B$(S28). The supply of the oil pressure $P_W'$ is held (standby control) until the point in time T1 when the engagement oil pressure $P_A$ starts the first sweep up (the start of the torque phase) ($t_{SE}$)(S29).

After the standby control, the control routine proceeds to the initial gear-change control whereby the oil pressure of the disengagement side frictional engagement elements is gradually decreased in synchronism with the start of the torque phase control by the engagement side frictional engagement elements. The timing of the start of this initial gear-change control and the subsequent drain gradient are appropriately determined by the oil-pressure release pattern calculation means U2 of the control unit U in accordance with the input torque and the oil temperature. To determine this timing, the oil-pressure release pattern calculation means U2 calculates an initiation adjustment time Ta for adjusting the starting time of the initial control of the disengagement side oil pressure, and a drain speed adjusting time Tb for adjusting a subsequent sweep down time with respect to the standard starting point time T1 of the initial speed-change control of the disengagement side frictional engagement elements, i.e., the starting point time T1 of the torque phase control of the engagement side frictional engagement elements.

Figure 8:
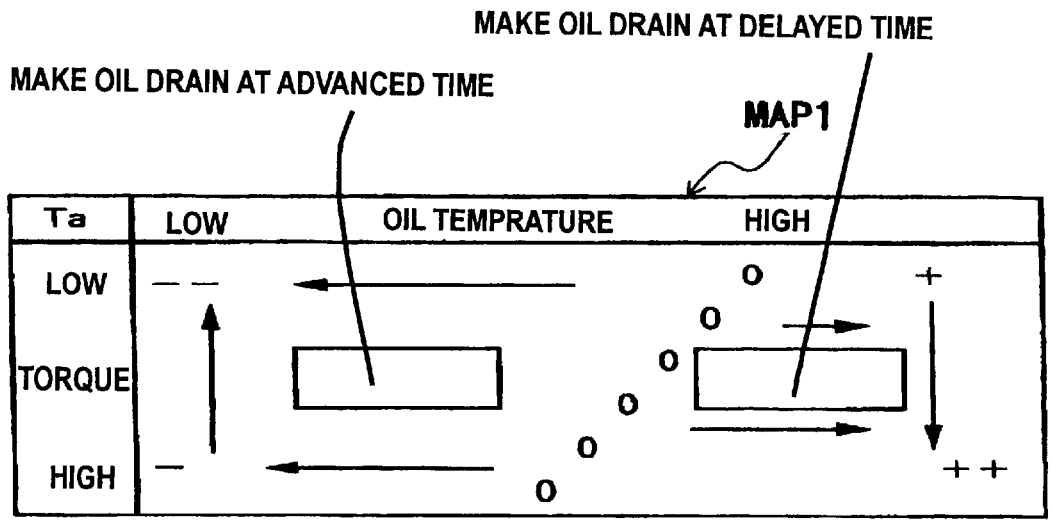
FIG. 8 is a map showing the relationship between the initiation adjustment time and the drain speed adjustment time and the oil temperature and the input torque.
Figure 8:
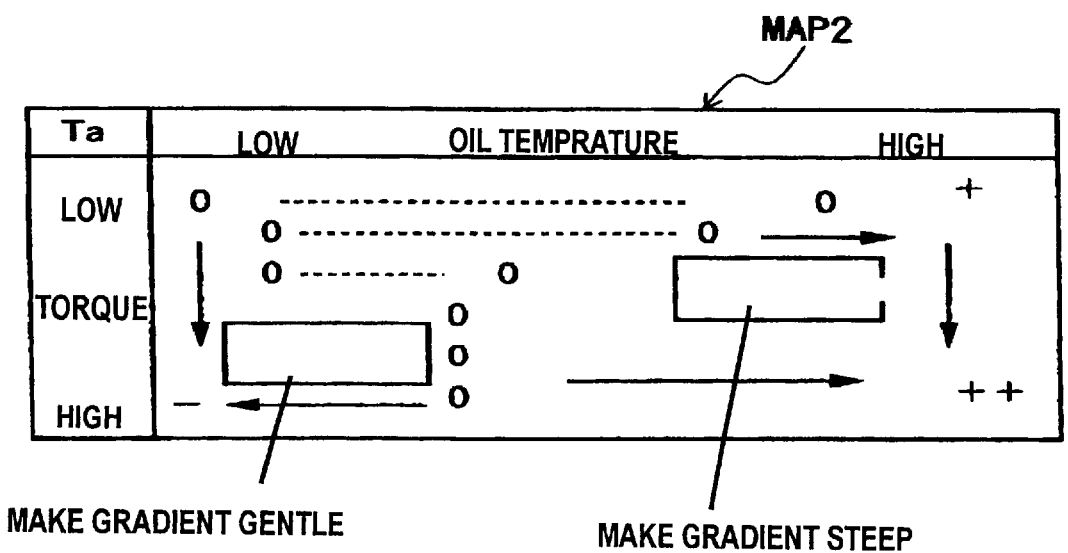
Figure 9:
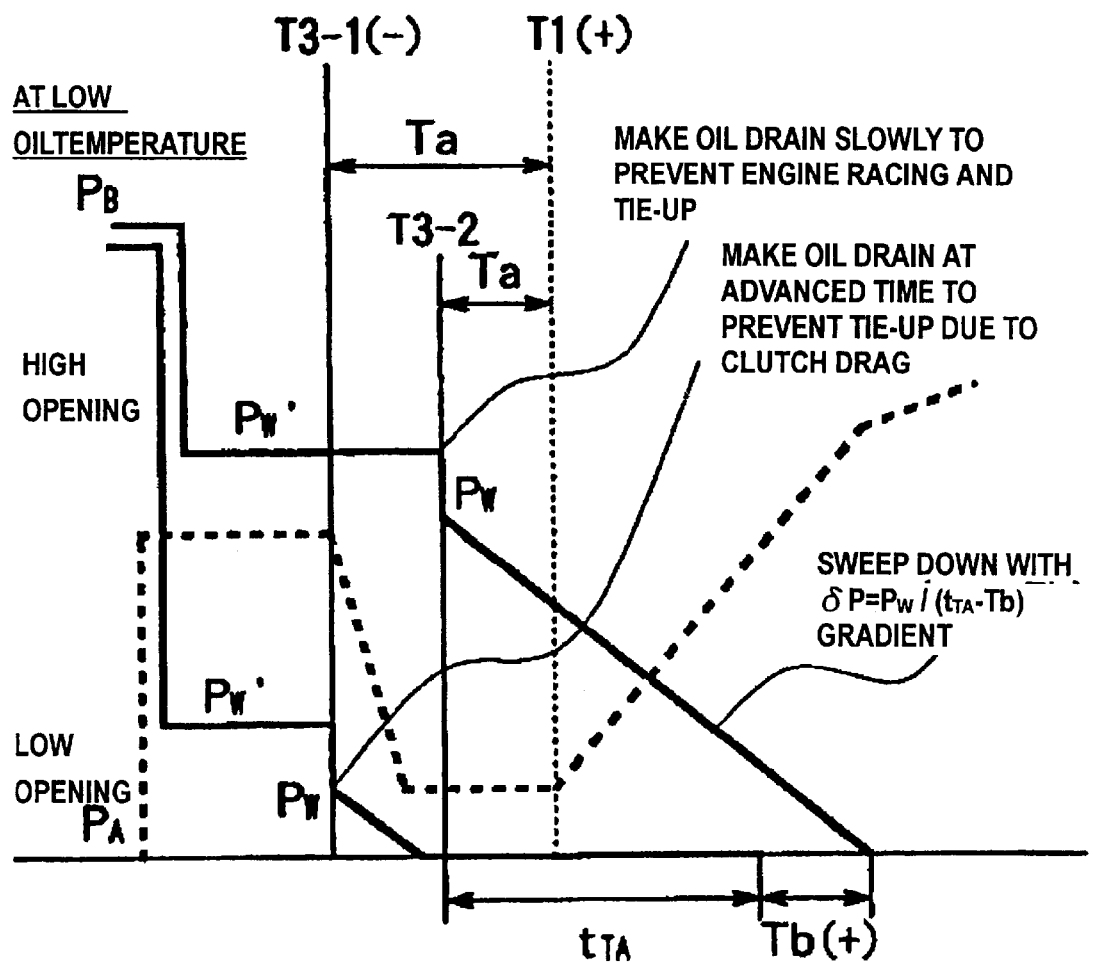
FIG. 9 is a time chart showing an example of initial gear-change control of the disengagement side at low oil temperature.
Figure 10:
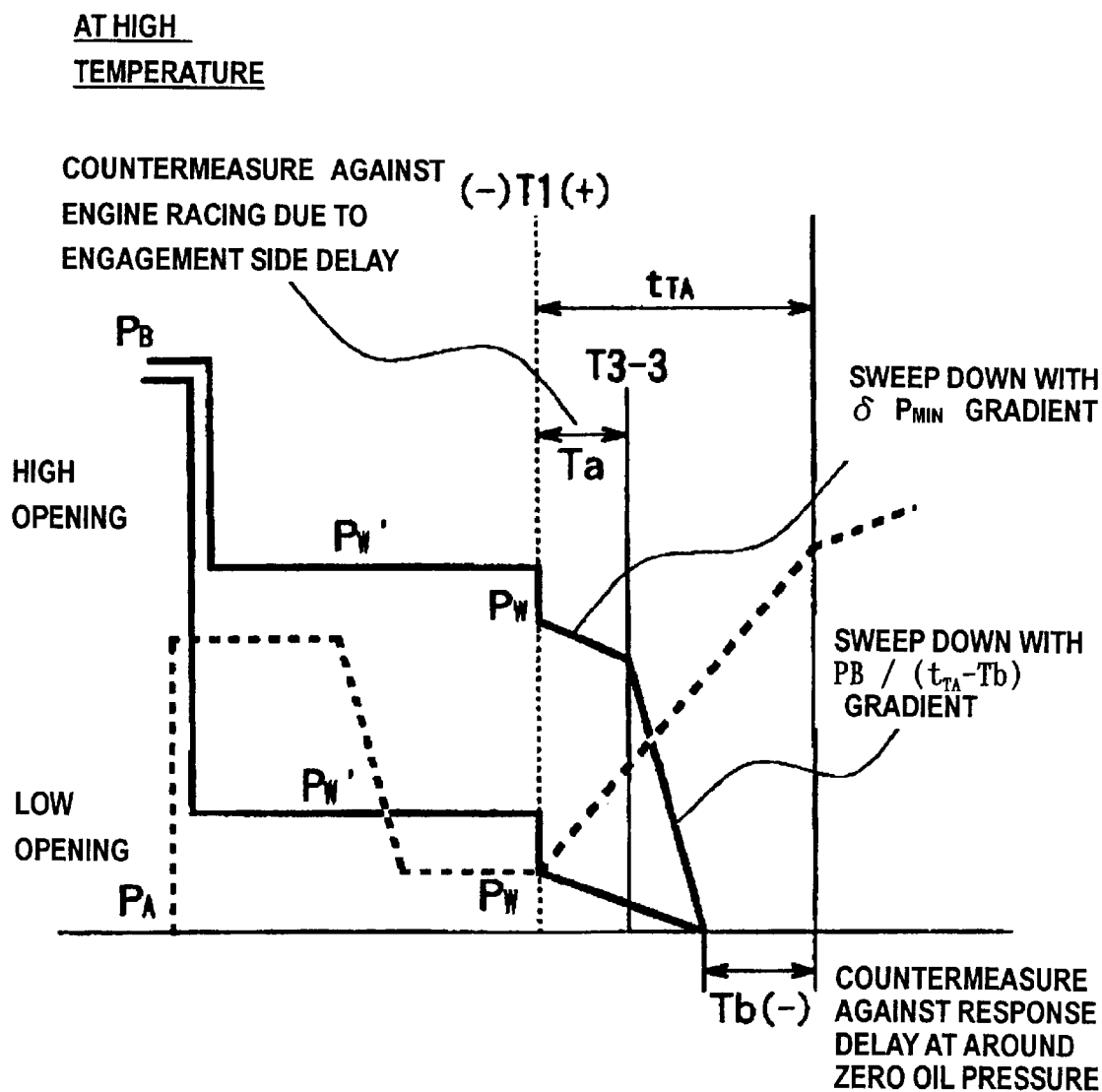
FIG. 10 is a time chart showing an example of initial gear-change control of the disengagement side at high oil temperature.

The oil pressure release pattern calculation means U2 determines the initiation adjustment time Ta and the drain speed adjustment time Tb by referring to maps MAP1 and MAP2 shown in FIG. 8, in accordance with the input torque and the oil temperature at that point in time. The map MAP1 gives relationships of the oil temperature and the input torque to the initiation adjustment time Ta. The initiation adjustment time Ta is set such that, at the same oil temperature, the timing of draining of the hydraulic fluid from the disengagement side frictional engagement elements ("drain timing") is advanced (in time) as the input torque becomes lower, and, for a given input torque, is also advanced as the oil temperature becomes lower. The initiation adjustment time Ta is, as shown in FIG. 9 and FIG. 10, indicated as a time period extending to the standard initiation time T1, where Ta is a positive(+) value to the right side of time T1 in the drawing and a negative (−) value to the left side of T1.

The timing of draining of the hydraulic fluid from the disengagement side frictional engagement element is advanced as the input torque becomes smaller, at a constant given oil temperature because, since the holding time of the disengagement side frictional engagement elements tends to become longer due to the influence of the response delay of the oil pressure and the drag torque. Thus, draining at an earlier time serves to reduce tie-up shock.

The drain timing of the hydraulic fluid from the disengagement side frictional engagement element is advanced (in time) as the oil temperature becomes lower, for a given input torque because, since the response delay of the oil pressure occurs to a larger extent with decreasing oil temperature, advance of the time of draining compensates for this delay and reduces the tie-up shock resulting from the response delay.

The map MAP2 defines the relationships of the oil temperature and the input torque to the drain speed adjustment time Tb. As the drain speed adjustment time decreases, the drain gradient becomes gentler. Accordingly, the speed of draining becomes slower. The standard drain gradient δ is $P_W/t_{TA}$. Moreover, as the drain speed adjustment time Tb increases, the sweep gradient becomes steeper and, therefore, the drain speed becomes faster. In the map MAP2, the lower the oil temperature becomes and the higher the input torque becomes, and the more the drain speed adjustment time Tb decreases, the slower the drain speed becomes. The higher the oil temperature and input torque become, the more the drain speed adjustment time Tb is increased and the steeper the sweep gradient becomes. Accordingly, the drain speed becomes faster. The drain speed adjustment time Tb is a positive value (+) when the time is extended to be more than the time necessary for the torque phase control of the engagement side $t_{TA}$, which is used in a formula for a standard drain gradient $δ=P_W/t_{TA}$, and is a negative value (−) when the time is shortened to less than the aforementioned necessary time.

When the oil-pressure release pattern calculation means U2 determines the initiation adjustment time Ta and the drain speed adjustment time Tb from the present oil temperature and input torque, referring to the maps MAP1 and MAP2, the gear-change execution control means U4, in step S29 of FIG. 6, judges whether or not the time t has reached the drain starting point time T3 for the disengagement side frictional engagement elements, adjusted by the initiation adjustment time Ta. If the time has reached the point in time T3, the gear-change execution control means U4 enters the initial gear-change control which begins with step S30 and starts the draining of the oil pressure. Therefore, steps S28 to S29 correspond to the standby ("waiting") control of the disengagement side frictional engagement elements.

Referring to FIG. 9, at low oil temperatures, the draining is started not at the point in time T3 but rather, at a point in time T3-1 or T3-2 that is earlier than the standard initiation time T1 by the time period Ta. Specifically, when the throttle opening is large, i.e., the input torque is high, the draining starts at T3-2. When the opening of the throttle is low, i.e., the input torque is low, the draining starts at time T3-1 which is earlier than the point in time T3-2. At high input torque, the draining has to be started earlier to prevent the release delay due to the response delay in the oil pressure. At low input torque, the draining has to be started yet earlier to compensate for the drag torque that occurs in the disengagement side frictional engagement elements.

As shown in FIG. 10, at a high oil temperature, only when the input torque is high, the draining is started not at the point in time T3 but at the point in time T3-3 which is later than the standard initiation time T1 by the time period Ta. At low input torque, the draining is started at the standard initiation time T1 (this applies to the case shown in FIG. 10.). This may be caused by the fact that, when the input torque is low, the engine tends to race when the input torque is low with high input torque because of the delay in the engagement side.

The gear-change execution control means U4 again obtains the allotment torque $T_B$ and the corresponding engagement pressure $P_W$ based on the input torque Tt in steps S30, S31. The engagement pressure $P_W$ is supplied as the disengagement side oil pressure (S32). In step S33, when the initiation adjustment time Ta obtained by the oil-pressure release pattern calculation means U2 is not less than zero, that is, when the draining is started at a time lagging the standard initiation time T1 by the time period Ta, as exemplified by the point in time T3-3 in FIG. 10 (for example, in the state where the input torque is high and oil temperature is also high, and the engine tends to start racing when the draining of the disengagement side hydraulic fluid has just started, etc.), the timer is reset in step S34. In step S35, the draining of the oil pressure is started at the standard initiation time T1 and conducted slowly with the minimum gradient δPmin (sweep down) until time T3-3 (S36 to S37).

Thus, the draining is started when the time reaches the point in time T1 or T3 (T3-1, T3-2, T3-3, etc.). In step S39, the gear-change execution control means U4 calculates the sweep gradient δP at each draining by use of the following formula:

$$\delta P = P_W/(t_{TA}-Tb)$$

wherein $t_{TA}$ is the engagement side sweep time. Then the oil pressure is swept down with the resultant sweep gradient δP (S40).

This sweep gradient δP is altered according to the drain speed adjustment time Tb obtained by the oil-pressure release pattern calculation means U2. As shown in FIG. 9, at a low oil temperature, the sweep time ($t_{TA}$-Tb) is modified in the following manner. When the opening of the throttle is high, that is, when the input torque is high, the gradient is made gentler in accordance with the sweep gradient on the engagement side so as to prevent engine racing and tie-up. Meanwhile, when the input torque is low, the gradient is made steeper than that for high torque, such that the draining is started earlier, and the disengagement side frictional engagement elements are held by the drag torque to reduce the subsequent tie-up shock. At a high oil temperature, as shown in FIG. 10, the drain gradient is set in accordance with the sweep gradient on the engagement side so as to be steeper than that at the low temperature. As shown in FIG. 10, the sweep gradient is made steeper at high oil temperatures so as to realize early draining, thus preventing the tie-up which would otherwise result from the response delay of the frictional engagement elements at around zero oil pressure.

In this way, the sweep down of the disengagement side oil pressure by the aforementioned gear-change execution control means U4 is continued, likewise the engagement side oil pressure, until the change in the input shaft rotational speed ΔN reaches the rotational speed dNs for detecting a predetermined shift start (S42). The routine in steps S20 to S42 corresponds to the initial gear-change control.

Subsequently, the change in the release oil pressure $\delta P_E$ is set and the oil pressure is swept down with the gradient of the oil pressure change (S43). The sweep down is continued until the disengagement side oil pressure $P_B$ becomes zero (S44). By the end of this sweep down, the control of the disengagement side oil pressure is completed. The routine in step S43 corresponds to the release control.

Figure 11:
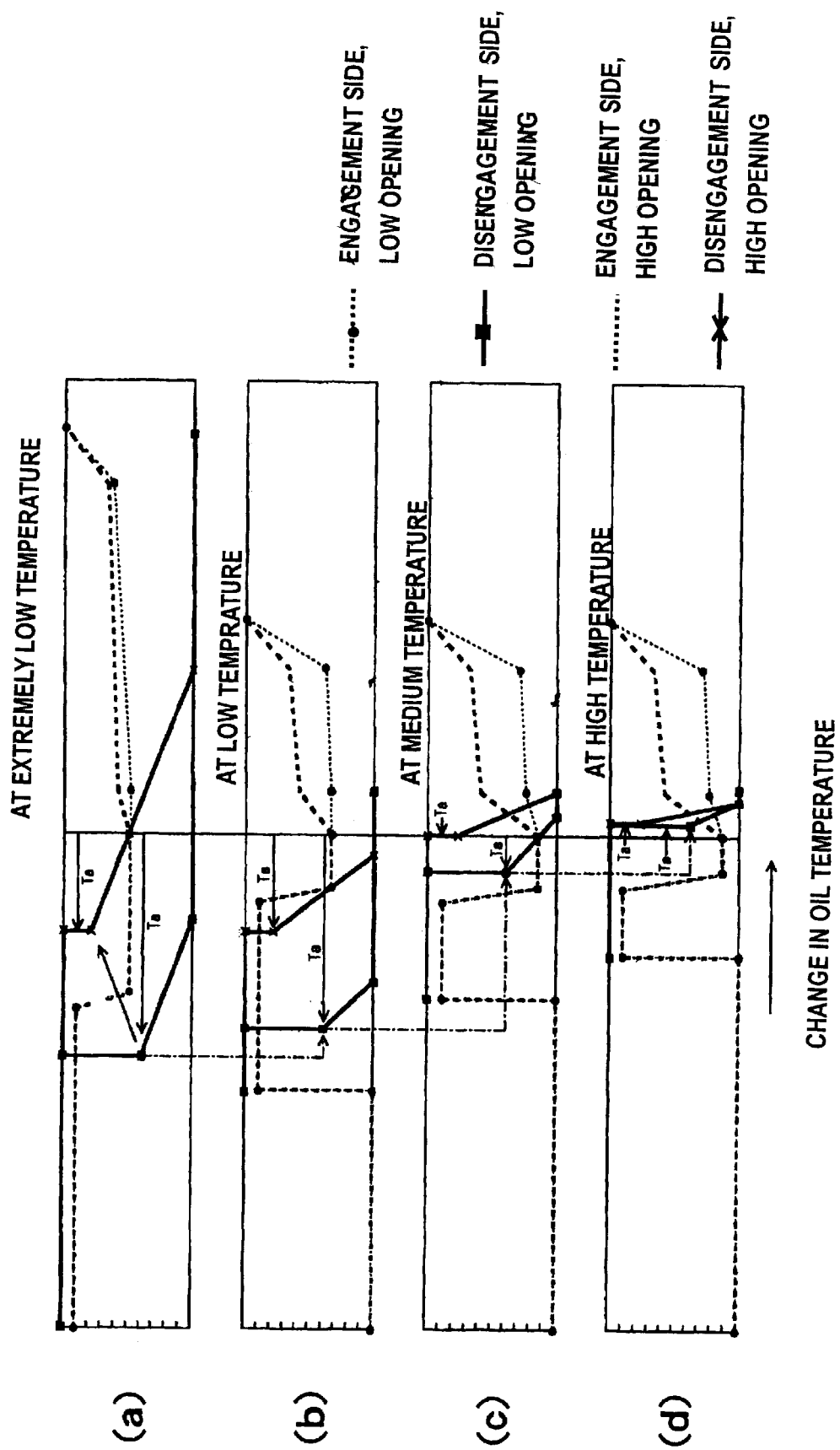
FIG. 11 is a time chart of the oil pressure of the frictional engagement elements at different oil temperatures.

FIG. 11 shows time charts of the engagement side and disengagement side oil pressures under the control described above when the oil temperature is (a) extremely low, (b) low, (c) medium, and (d) high, at different input torques. As can be clearly understood from the drawing, the oil temperature decreases, the initiation adjustment time Ta is moved further to the negative (−) side. The draining of the oil pressure of the disengagement side frictional engagement elements is started earlier so as to prevent the tie-up due to the delay in the disengagement side draining. Further, at the low oil temperature, the oil pressure is released at a delayed time at high input torque, as compared to the timing of release at the low input torque. The sweep gradient is held gentle so as to prevent engine racing.

When the oil temperature becomes high, the initiation adjustment time Ta is shifted further to the positive (+) side, so that engine racing, which would otherwise occur, due to the response delay in the engagement side, is prevented. When the oil temperature is further raised, the drain speed adjustment time Tb is shifted further to the positive (+) side, and the sweep gradient becomes steeper. By draining the hydraulic fluid in a short time, the tie-up which would otherwise occur due to the response delay at around zero oil pressure in the disengagement side is prevented.

The initial gear-change operation of the disengagement side is basically synchronized with the torque phase control operation at the engagement side. Even if multiple speed-change operations are required, the hydraulic control device can cope with such a requirement easily in accordance with the gear-change state at the engagement side as a reference.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

The entirety of the teachings of Japanese Application No. H11-302131, filed Oct. 25, 1999, inclusive of its specification, claims and drawings, is incorporated herein by reference.

What is claimed is:

1. A hydraulic control device for an automatic transmission provided with an input shaft which receives torque from an output shaft of an engine, an output shaft for outputting torque to the wheels, a plurality of frictional engagement elements for changing a torque transfer path between the input and output shafts, and hydraulic servos for engaging or disengaging the frictional engagement elements, wherein an up-shift to a predetermined gear ratio is achieved by engaging first frictional engagement elements at a predetermined engagement side oil pressure and disengaging second frictional engagement elements at a predetermined disengagement side oil pressure, said hydraulic control device comprising:

input torque calculation means for calculating input torque; and gear-change execution control means for controlling the drain timing of the disengagement side oil pressure, acting on the second frictional engagement elements, in accordance with the calculated input torque in a torque phase control wherein both the engagement side oil pressure and the disengagement side oil pressure are controlled, and wherein the disengagement side oil pressure is controlled by advancing the drain timing of the disengagement side oil pressure as the calculated input torque decreases.

2. The hydraulic control device for an automatic transmission according to claim 1, wherein the gear-change execution control means advances the drain timing of the disengagement side oil pressure acting on the second frictional engagement elements, in accordance with elevation of oil temperature and decrease in the calculated input torque, in the torque phase control.

3. The hydraulic control device for an automatic transmission according to claim 2, wherein the gear-change execution control means controls a drain gradient of the disengagement side oil pressure acting on the second frictional engagement elements, in accordance with the decrease in calculated input torque and with elevation of oil temperature, in the torque phase control.

4. The hydraulic control device for an automatic transmission according to claim 3, wherein the gear-change execution control means makes the drain gradient steeper as the oil temperature increases.

5. The hydraulic control device for an automatic transmission according to claim 1, wherein the gear-change execution control means controls a drain gradient of the oil pressure acting on the second frictional engagement elements, in accordance with elevation of the oil temperature and with elevation of oil temperature, in the torque phase control.

6. The hydraulic control device for an automatic transmission according to claim 5, wherein the gear-change execution control means makes the drain gradient of the oil pressure steeper as the oil temperature increases.

7. The hydraulic control device for an automatic transmission according to claim 1, wherein the gear-change execution control means controls a drain gradient of the disengagement side oil pressure acting on the second frictional engagement elements, in accordance with the calculated input torque and with elevation of oil temperature, in the torque phase control.

* * * * *